May 15, 1934. F. A. MITCHELL ET AL 1,958,587

CARRYING HANDLE FOR PORTABLE GRAMOPHONES OR THE LIKE

Filed Jan. 28, 1930

INVENTORS
ALFRED CHARLES HISCOCKS
FRANK ALLEN MITCHELL
BY
*John A Hanrahan*
ATTORNEY Patented May 15, 1934

1,958,587

UNITED STATES PATENT OFFICE 1,958,587

CARRYING HANDLE FOR PORTABLE GRAMOPHONES OR THE LIKE

Frank Allen Mitchell and Alfred Charles Hiscocks, London, England, assignors to Columbia Phonograph Company, Inc., Bridgeport, Conn., a corporation of New York Application January 28, 1930, Serial No. 423,937
In Great Britain November 13, 1929

2 Claims. (Cl. 16—115)

This invention relates to carrying handles and has particular reference to handles for use in connection with portable gramophones, wireless cabinets, attaché or like transportable case.

The object of the invention is to provide an inexpensive and collapsible carrying handle which is easily assembled and which automatically collapses when not in use.

The invention consists in a carrying handle of the character referred to wherein the handle is provided with an extension at each end adapted to pass through holes in a case or the like in such a manner that the handle is adapted to occupy a compact position against the case when not in use but can be readily extended to the operative carrying position.

The invention also consists in a carrying handle, according to the preceding paragraph in which one or more flat springs co-operate with the said extensions to maintain the handle in its compact position when not in use.

Further features will be disclosed with reference to the accompanying drawing which shows several modes of carrying the invention into effect and in which:—

Figure 1:
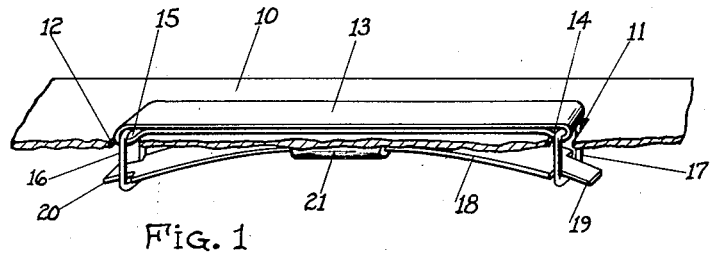
Figure 1 shows a handle according to the invention in its compact position.
Figure 2:
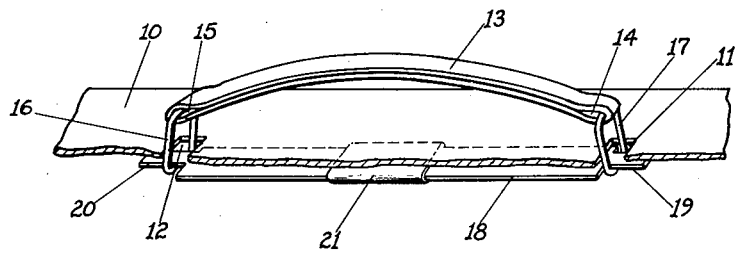
Figure 2 shows the same handle in its operative carrying position.

In carrying the invention into effect according to Figures 1 and 2, the side 10 of a portable case or the like which may conveniently be formed in sheet metal or any other suitable material is provided with two apertures preferably in the form of slots 11 and 12. These slots are located in the position usually occupied by the end links of a carrying handle.

A carrying handle member 13 may conveniently be formed from one or more strips of leather or other suitable material having loops 14 and 15 formed at the ends.

Rings or links 16 and 17 of metal wire or other suitable material are provided which may be formed as a square, rectangle or other suitable shape having one part adapted to be enclosed and received within the loops 14 and 15. The links 16 and 17 are adapted to be passed through the slots 11 and 12 referred to above and are engaged by the ends of a preferably bow-shaped spring 18 which in the illustration is reduced in width at 19 and 20 so as to maintain the spring in correct relation with the other parts. The center portion of the spring is preferably covered with a vibration absorbing material 21 such as rubber, paper or the like, and in some constructions the whole of the spring 18 or the links 16 and 17 may be so covered, to minimize rattle when used with a sound reproducing instrument.

It will be seen that when the handle member 13 is out of use, the springs 18 pulls the handle member through the medium of the links 16 and 17 into the position shown in Figure 1 close to the side of the case 10. When it is desired to carry the case, the handle 13 is pulled against the spring 18 into the position shown in Figure 2 where the ends 19 and 20 of the spring act as stops and prevent the further withdrawal of the links 16 and 17. As soon as the handle is released it will spring back into the compact position shown in Figure 1.

When the spring 18 is pulled flat against the side 10 of the case, that is to say, when the handle 13 is in the operative carrying position, the spring distributes the load over a greater area than is usual when ordinary links are used, thereby adding strength to the side 10 and preventing buckling of the material of the case in the region of the handle.

Figure 3:
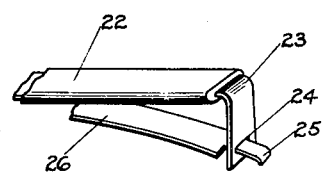
Figure 3 illustrates a further form of handle according to the invention.

According to a further form illustrated in Figure 3 the handle member 22 is provided with an extra lining 23 which may be of spring steel or other suitable material having its ends shaped and bent at right angles and perforated at 24 to engage with the ends 25 of the spring 26, thereby eliminating the use of separate links as in the previous example.

The handle portion 22 may be formed of leather, rubber tubing, woven tubing or a moulded material or other material as desired.

Figure 4:
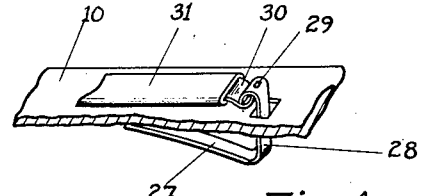
Figure 4 illustrates a modification of the handle.

Figure 4 illustrates a form in which a spring 27 is provided with projections 28 at the ends to take the place of the links 16 and 17 or bent portions 23 in Figures 1 to 3. A small projection 29 on the handle core 30 of handle 31 maintains the two members in correct relation while the spring pressure of the spring 27 keeps the two members 28 and 29 in contact.

Figure 5:
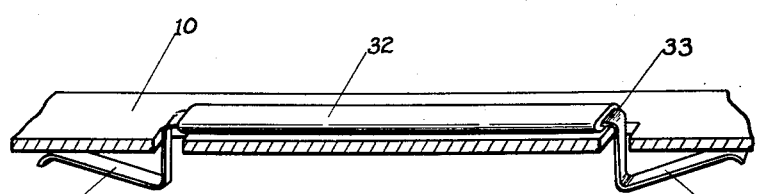
Figures 5 and 6 illustrate still further forms of the invention.
Figure 6:
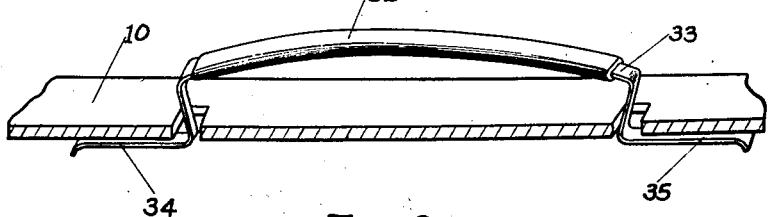

Figures 5 and 6 show a handle 32 provided with a core 33 formed of metal or other suitable material and which is preferably bent as shown at 34 and 35 so as to exert spring pressure on the inside of the case side 10, which may for example be formed of wood or other material.

A handle constructed according to any of the above described examples may conveniently be used with a portable gramophone, wireless set, or the like, and as the inside of the case is usually sealed or covered in some way, the inwardly projecting springs and links would not be visible and would be arranged so as not to foul the contents. It is obvious, that if required, a small box covering may be provided inside the case to enclose the springs and co-operating parts.

It is to be understood that the invention is not to be limited to the foregoing details of construction which are given by way of illustration only, as we may vary the mode of construction and material employed in any of the component parts; for example the spring may be divided or may be of multiple forms and of any convenient section other than flat as shown, while the parts may be interchanged or combined with known components depending upon the purpose for which the handle is to be employed, or any practical requirements that may have to be fulfilled.

Having now particularly described and ascertained the nature of our said invention and in what manner the same is to be performed, we declare that what we claim is:—

1. In combination, a handle, a case, said case having a pair of spaced openings in one of its walls, a normally bowed leaf spring within the case and intermediate its ends bearing against said wall of the case intermediate said openings, a connecting means passing freely through each of said openings, said connecting means pivotally connected at their outer ends with the respective end portions of the handle, said connecting means at their inner ends connected with the respective end portions of said spring, said handle constructed to lie against the outer surface of the case, said spring in normal condition when the handle is not in use, said spring when in normal condition serving to maintain the connecting means substantially entirely within the case and maintain the handle against the outer surface of the case, and said leaf spring arranged to be flexed from its normal condition and said connecting means drawn outwardly through the openings in the case to space the handle from the case when the handle is in use.

2. In combination, a handle, a case having a pair of spaced openings through a wall thereof, said handle constructed to lie against the outer surface of the case, a normally bowed spring within the case and having its convex portion disposed against the wall thereof between the openings, said spring adapted to have its ends disposed across the openings in the wall of the case to engage said wall at each side of the openings when the spring is flat against the wall against which it is disposed, means passing freely through the openings in the case and connecting the respective end portions of the handle with the spring, said spring acting through said means and maintaining the handle against the outer surface of the wall of the case when the handle is not in use and the ends of the spring spanning said openings and preventing withdrawal of said means through the openings when the handle is in use, and said means including a link pivotally connected with each end of the handle and looped over the respective ends of the spring.

FRANK ALLEN MITCHELL.
ALFRED C. HISCOCKS.